United States Patent
Kim et al.

(10) Patent No.: US 10,459,548 B2
(45) Date of Patent: Oct. 29, 2019

(54) COVER WINDOW AND ELECTRONIC DEVICE INCLUDING SAME

(71) Applicant: Samsung Electronics Co., Ltd., Gyeonggi-do (KR)

(72) Inventors: Seo Hyun Kim, Suwon-si (KR); Seung Taek Oh, Seoul (KR); Seok Gyu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 15/629,614

(22) Filed: Jun. 21, 2017

(65) Prior Publication Data

US 2017/0364172 A1    Dec. 21, 2017

(30) Foreign Application Priority Data

Jun. 21, 2016  (KR) .................. 10-2016-0077618

(51) Int. Cl.
  *G06F 3/041*  (2006.01)
  *G06F 1/16*  (2006.01)
  (Continued)

(52) U.S. Cl.
  CPC .............. *G06F 3/041* (2013.01); *G02B 5/00* (2013.01); *G02B 5/208* (2013.01); *G02B 5/281* (2013.01);
  (Continued)

(58) Field of Classification Search
  CPC .... G06F 1/1626; G06F 1/1637; G06F 1/1658; G06F 1/1684; G06F 1/1686;
  (Continued)

(56) References Cited

U.S. PATENT DOCUMENTS 8,912,480 B2   12/2014  Pope et al.
9,846,473 B1 *  12/2017  Kalscheur ............ G06F 1/3231
(Continued)

FOREIGN PATENT DOCUMENTS

WO   2008139363 A2    11/2008
WO   2014-088469 A1    6/2014

OTHER PUBLICATIONS

International Search Report dated Oct. 19, 2017 in connection with International Patent Application No. PCT/KR2017/006533.
(Continued)

*Primary Examiner* — Nidhi Thaker

(57) ABSTRACT

An electronic device includes a processor and a housing having a first surface, a second surface, and a side surface. A touch screen display is exposed through a first area of the first surface. An optical sensor is disposed under a second area of the first surface that is adjacent to the first area. The optical sensor receives and/or emits an infrared ray. The first surface includes a substantially transparent glass layer, an opaque layer disposed between the glass layer and the second surface, and a color layer disposed between the opaque layer and the glass layer. The opaque layer includes an opening, a location and a size of which correspond to at least a portion of the optical sensor when viewed from the first surface. The optical sensor receives and/or emits the infrared ray through the opening, the color layer, and the glass layer.

20 Claims, 18 Drawing Sheets

(51) Int. Cl.
  *G02B 5/00*  (2006.01)
  *G02B 5/20*  (2006.01)
  *G02B 5/28*  (2006.01)

(52) U.S. Cl.
  CPC .............. *G06F 1/16* (2013.01); *G06F 1/1626* (2013.01); *G06F 1/1637* (2013.01); *G06F 1/1643* (2013.01); *G06F 1/1684* (2013.01); *G06F 1/1686* (2013.01)

(58) Field of Classification Search
  CPC ...... G06F 1/1688; G06F 1/169; G06F 1/1694; G06F 3/041; G06F 1/1643
  See application file for complete search history.

(56) References Cited

U.S. PATENT DOCUMENTS

| | | | |
|---|---|---|---|
| 2008/0158173 A1* | 7/2008 | Hamblin | G06F 1/1626 345/173 |
| 2010/0053861 A1 | 3/2010 | Kim et al. | |
| 2010/0282953 A1* | 11/2010 | Tam | G01J 1/1626 250/226 |
| 2012/0129579 A1* | 5/2012 | Tam | G01J 5/0025 455/575.1 |
| 2012/0129580 A1* | 5/2012 | Tam | G01S 7/4813 455/575.1 |
| 2012/0295665 A1* | 11/2012 | Pantfoerder | G01J 1/0407 455/566 |
| 2013/0048837 A1* | 2/2013 | Pope | G01J 1/0422 250/214.1 |
| 2013/0063810 A1 | 3/2013 | Miyaguchi et al. | |
| 2013/0242479 A1 | 9/2013 | Yoo et al. | |
| 2013/0313672 A1 | 11/2013 | Min | |
| 2014/0034835 A1 | 2/2014 | Frey et al. | |
| 2014/0127442 A1 | 5/2014 | Ryu et al. | |
| 2014/0184471 A1 | 7/2014 | Martynov et al. | |
| 2017/0184764 A1* | 6/2017 | Matsuyuki | G02B 5/208 |

OTHER PUBLICATIONS

European Patent Office, "Supplementary European Search Report," Application No. 17815716.0, dated May 22, 2019, 10 pages.

* cited by examiner

|  |  | L* | a* | b* | ΔE |
|---|---|---|---|---|---|
| 401 FIRST COLOR | FIRST AREA | 30.71 | -0.02 | -2.2 | 0.14 |
|  | SECOND AREA | 30.8 | -0.03 | -2.31 |  |
| 402 SECOND COLOR | FIRST AREA | 80.52 | -1.05 | 1.16 | 0.44 |
|  | SECOND AREA | 80.39 | -1.22 | 0.77 |  |
| 403 THIRD COLOR | FIRST AREA | 69.78 | 3.05 | 12.94 | 0.31 |
|  | SECOND AREA | 70.04 | 2.94 | 12.82 |  |
| 404 FOURTH COLOR | FIRST AREA | 59.09 | -6.69 | -24.18 | 0.19 |
|  | SECOND AREA | 59.24 | -6.72 | -24.07 |  |

| Layer | FIRST COLOR 401 | | SECOND COLOR 402 | | THIRD COLOR 403 | | FOURTH COLOR 404 | |
|---|---|---|---|---|---|---|---|---|
| | MATERIAL | THICKNESS(Å) | MATERIAL | THICKNESS(Å) | MATERIAL | THICKNESS(Å) | MATERIAL | THICKNESS(Å) |
| 1 | TiO$_2$ | 40~80 | Al$_2$O$_3$ | 16~24 | TiO$_2$ | 220~340 | TiO$_2$ | 560~840 |
| 2 | SiO$_2$ | 190~290 | Indium | 300~420 | Indium | 380~580 | Al$_2$O$_3$ | 16~24 |
| 3 | TiO$_2$ | 140~220 | Al$_2$O$_3$ | 160~240 | TiO$_2$ | 560~840 | Indium | 190~290 |
| 4 | | | TiO$_2$ | 16~24 | Al$_2$O$_3$ | 120~180 | TiO$_2$ | 240~360 |
| 5 | | | | | TiO$_2$ | 16~24 | Al$_2$O$_3$ | 160~240 |
| 6 | | | | | | | TiO$_2$ | 16~24 |

COVER WINDOW AND ELECTRONIC DEVICE INCLUDING SAME

CROSS-REFERENCE TO RELATED APPLICATION(S) AND CLAIM OF PRIORITY

The present application is related to and claims the benefit under 35 U.S.C. § 119(a) of a Korean patent application filed on Jun. 21, 2016, in the Korean Intellectual Property Office and assigned Serial number 10-2016-0077618, the entire disclosure of which is hereby incorporated by reference.

TECHNICAL FIELD

The disclosure relates to a cover window and an electronic device including the same.

BACKGROUND

An electronic device, such as a smartphone, may support various functions such as voice communication, photographing, and reproduction of videos. Further, the electronic device may support a function of adjusting the brightness of a screen of a display or a function of turning off a screen of a display by detecting an approach of the head of the user during voice communication according to surrounding environments. In order to support the function, the electronic device may include an infrared (IR) sensor. The IR sensor, for example, may irradiate infrared light (an infrared ray) having a specific wavelength band, and may receive the infrared light that is reflected by an object and returns to detect a proximity of the object or detect an intensity of illumination of a peripheral area.

Meanwhile, the electronic device may include a cover window that forms a part of an external appearance of the electronic device to protect a screen of the display. The cover window may have at least one hole. The at least one hole formed in the cover window may include a sensor hole that functions as a passage of light irradiated from the IR sensor and light that enters the IR sensor.

The electronic device of the related art has a sensor hole formed in the cover window to be viewed from the outside, so that an integral feeling of an external appearance of the electronic device may deteriorate.

SUMMARY

To address the above-discussed deficiencies, it is a primary object to provide a cover window that has a sensor hole, which is not viewed from the outside, and an electronic device including the same.

In accordance with an aspect of the present disclosure, an electronic device includes a housing including a first surface facing a first direction, a second surface facing a second direction that is opposite to the first direction, and a side surface surrounding at least a portion of a space between the first surface and the second surface, a touch screen display disposed within the housing and exposed through a first area of the first surface, an optical sensor included within the housing, disposed under a second area of the first surface that is adjacent to the first area, and configured to receive and/or emit an infrared ray, and a processor electrically connected to the display and the optical sensor. The first surface includes a substantially transparent glass layer, an opaque layer disposed between the glass layer and the second surface, and a color layer disposed between the opaque layer and the glass layer and forming at least a portion of a color exposed through the glass layer. The opaque layer includes an opening, a location and a size of which correspond to at least a portion of the optical sensor when viewed from the first surface, and the optical sensor receives and/or emits an infrared ray through the opening, the color layer, and the glass layer.

In accordance with another aspect of the present disclosure, a cover window of an electronic device includes a glass layer formed of a transparent material, disposed at an outskirt of the electronic device, and configured to protect the electronic device from an external impact, a color layer stacked under the glass layer and configured to realize a designated color, and an opaque layer stacked under the color layer and printed opaquely in an area other than a designated area of the cover window. Light of a first wavelength band passes through the color layer at a first ratio or more, and light of a second wavelength band passes through the color layer at a second ratio or less.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4B is a view illustrating a CIE LAB color coordinate in an IR sensor hole area and a peripheral area according to an embodiment.

FIG. 4C is a view for explaining a deposition structure of a color layer according to an embodiment.

Throughout the drawings, it should be noted that like reference numbers are used to depict the same or similar elements, features, and structures.

DETAILED DESCRIPTION

Figure 1:
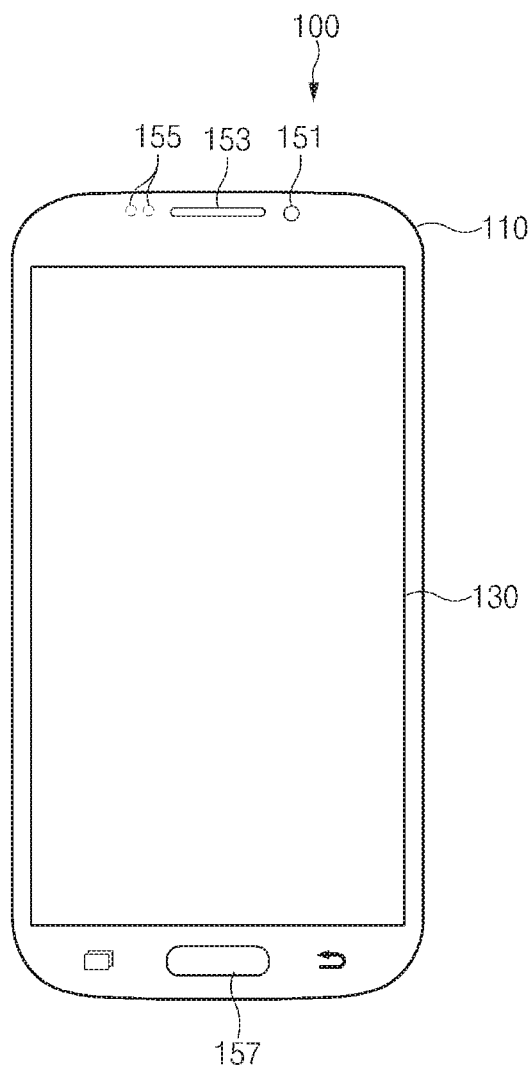
FIG. 1 is a front view of an electronic device according to an embodiment.

FIGS. 1 through 7G, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HIVID)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MM), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a front view of an electronic device according to an embodiment.

According to various embodiments, the electronic device 100 may support various functions, such as voice communication, photographing, or play of videos. For example, the electronic device 100 may include a speaker (or a receiver) for voice communication, a camera for photographing, or a display for playing a video. Further, the electronic device 100 may include an infrared sensor (IR sensor) that may detect a proximity of an object or an intensity of illumination of surroundings, and may support a function of switching off a screen of the display or adjusting a brightness of the screen of the display according to peripheral environments by detecting whether the head of a user approaches the electronic device 100 during voice communication. Further, the electronic device 100 may prevent an unintended touch which can be caused by the head of the user contacting the electronic device 100 by deactivating a touch panel or adjusting a touch sensitivity of the touch panel during voice communication.

Referring to FIG. 1, in order to support the above-mentioned function, the electronic device 100 may include a cover window 110 and a display 130. The cover window 110 may be formed on at least one outer surface of a housing (not illustrated). For example, the cover window 110 may be attached to a front surface of the housing. In this regard, the housing 110 may include a front surface, a rear surface, and a side surface partially surrounding a space between the front surface and the rear surface. The housing may be configured to fix and support the elements of the electronic device 110.

At least one hole (or opening) may be formed on one surface of the cover window 110. For example, a camera hole 151, a receiver hole 153 (or a speaker hole), or an IR sensor hole 155 may be formed on a front surface of the cover window 110. The drawing illustrates a state in which the camera hole 151 is formed on the right side of an upper end of the front surface of the cover window 110, the receiver hole 153 is formed at the center of the upper end of the front surface of the cover window 110, and the IR sensor hole 155 is formed on the left side of the upper end of the front surface of the cover window 110. However, the number and locations of the holes formed on the one surface of the cover window 110 are not limited thereto. According to various embodiments, at least one hole may be further formed in addition to the above-mentioned holes, and at least one of the above-mentioned holes may be omitted.

The camera hole 151 may function as a passage of light for the camera disposed inside the housing. For example, the camera may be disposed at a location at which the camera is aligned with the camera hole 151 to produce a captured image by using image light of a subject, which is input through the camera hole 151. The receiver hole 153 may function as a passage of sound for the receiver disposed inside the housing. For example, the receiver may output voice of a counterpart during a voice communication with the counterpart, and the output voice may be delivered to the outside through the receiver hole 153. The IR sensor hole 155 may function as a passage of light for the IR sensor disposed inside the housing. For example, the IR sensor hole 155 may function as a passage of light irradiated from the IR sensor and light input to the IR sensor.

According to various embodiments, the IR sensor hole 155 formed in the cover window 110 may be formed so as not to be viewed from the outside. For example, an area of the IR sensor hole 155 may have an external appearance that is the same as or similar to a peripheral part such that the IR sensor hole 155 is not distinguished from the peripheral part. According to an embodiment, the cover window 110 may be formed such that light of a specific wavelength is input to an area in which the IR sensor hole 155 is formed. For example, the cover window 110 may be formed such that light of an infrared ray area (e.g., an area including a wavelength of about 940 nm) is input to the area in which the IR sensor hole 155 is formed at a specific ratio or more, and light of a visible ray area (e.g., an area including a wavelength of about 550 nm) is input to the area in which the IR sensor hole 155 is formed at the specific ratio or less. Through this, because a difference between a reflective color feeling of the area of the IR sensor hole 155 and a reflective color feeling of the peripheral part is a specific color difference or less, the IR sensor hole 155 may not be distinguished from the peripheral part when viewed from the outside. A stack structure of the cover window 110 for this will be described through embodiments.

The display 130 may display various content (e.g., a text, an image, a video, an icon, and a symbol). According to an embodiment, the display 130 may include a touch screen, and may receive a touch, a gesture, a proximity, or a hovering input using an electronic pen or the user's body.

The display 130 may be seated within the housing. Further, a cover window 110 may be disposed on the display 130. For example, the cover window 110 may be coupled to one surface (e.g., a front surface) of the housing to cover the display 130. At least an area of the cover window 110 may be formed of a transparent material (e.g., glass), and a screen that output on the display 130 may be displayed to the outside through the transparent area of the cover window 110.

The electronic device 110 may include at least one function button. The function button may provide an interface for receiving a user input. For example, a home button 157 functioning to convert the screen of the display 130 to a home screen may be formed at a lower end of the electronic device 100. As another example, a volume key (not illustrated) configured to perform functions such as control of the volume of voice communication or control of the volume of play of a multimedia file may be formed at a side portion of the electronic device 100.

Figure 2A:
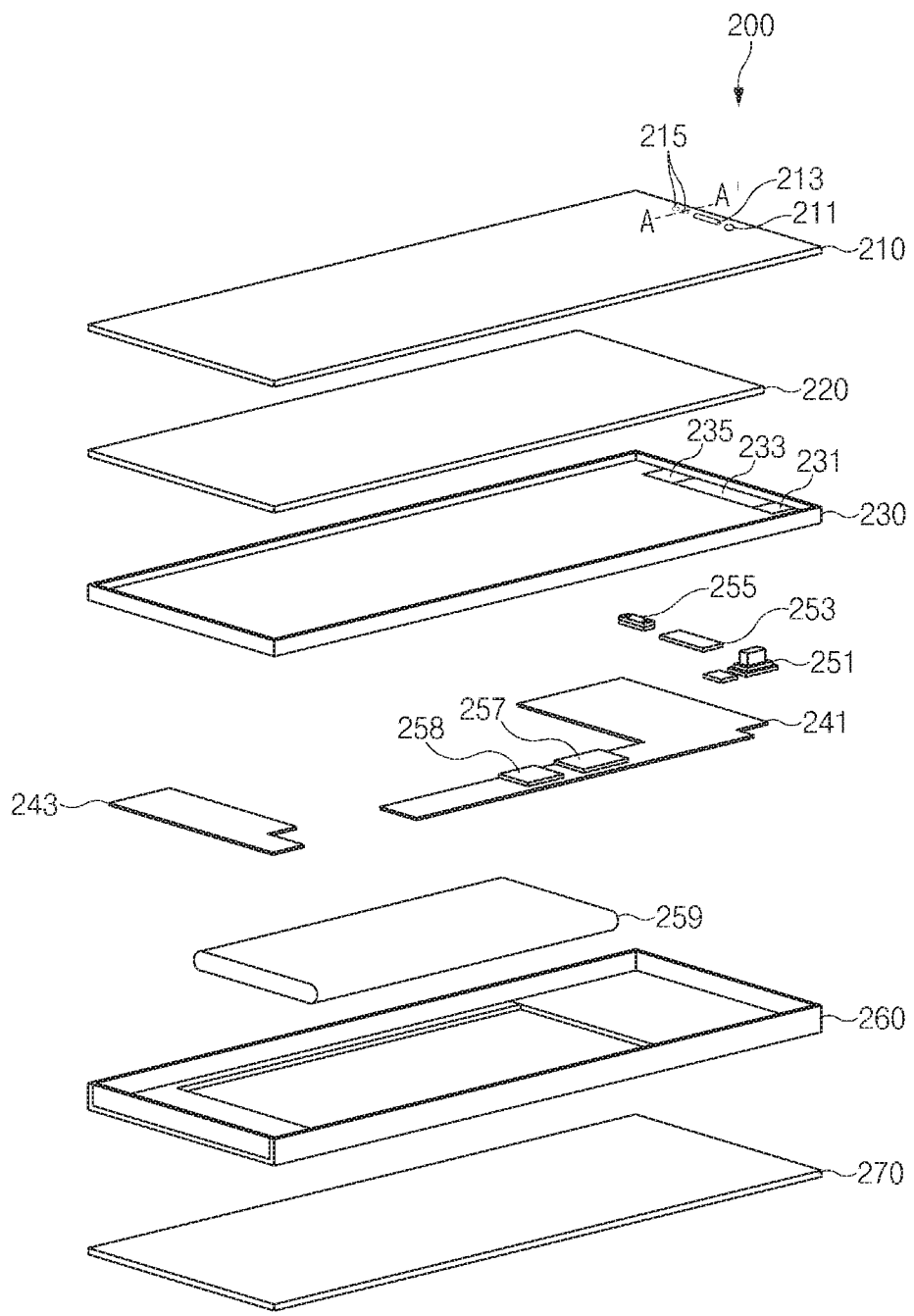
FIG. 2A is an exploded perspective view of an electronic device according to an embodiment.
Figure 2B:
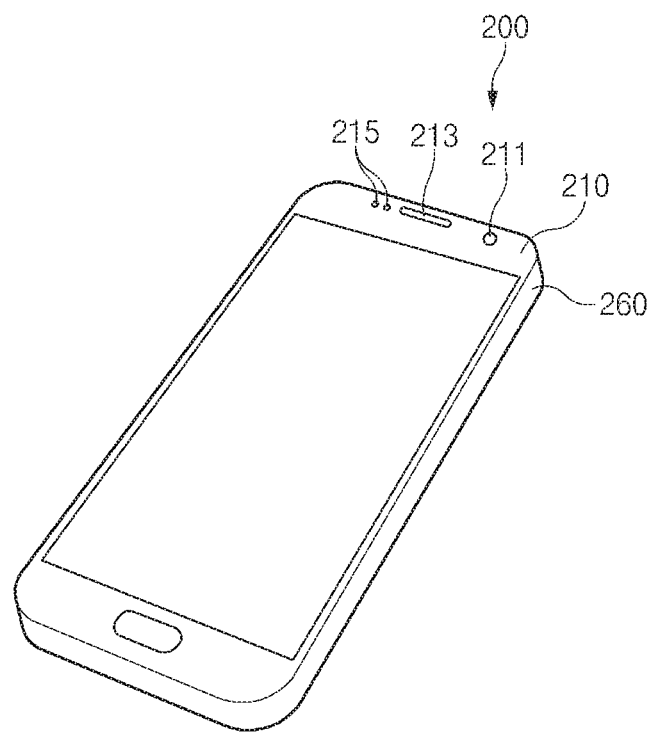
FIG. 2B is a perspective view of an electronic device according to an embodiment.

FIG. 2A is an exploded perspective view of an electronic device according to an embodiment, and FIG. 2B is a perspective view of an electronic device according to an embodiment.

Referring to FIGS. 2A and 2B, the electronic device 200 may include a cover window 210, a display 220, a bracket 230, a printed circuit board 140 (e.g., a first circuit board 241, a second printed circuit board 243, a housing 260, and a rear cover 270). The cover window 210 may define an external appearance of the electronic device 200. The cover window 210 may be disposed on the display 220 to cover the display 220. At least an area of the cover window 210 may be formed of a transparent material, and a screen output through the display 220 may be displayed to the outside through the transparent area of the cover window 210.

The cover window 210 may have at least one hole. For example the cover window 210 may include a camera hole 211, a receiver hole 213, and an IR sensor hole 215. The camera hole 211 may function as a passage of light for the camera 251 seated in the housing 260. The camera hole 211 may be disposed at a location at which the camera 251 is aligned with the camera hole 211.

The receiver hole 213 may function as a passage of sound for the receiver 253 seated in the housing 260. The receiver hole 231 may be formed to be connected to a space in which the receiver 253 is seated. The IR sensor hole 215 may function as a passage of light for the IR sensor 255 seated in the housing 260. The IR sensor hole 215 may be disposed to be aligned with a location at which the IR sensor 255 is seated. The IR sensor hole 215 may include a hole for a light emitting part of the IR sensor 255 and a hole for a light receiving part of the IR sensor 255 separately, and may be integrally formed.

The display 220, for example, may include a liquid crystal display (LCD), a light emitting diode (LED) display, an organic light emitting diode (OLED) display, a microelectromechanical system (MEMS) display, or an electronic paper display. The display 220 may display various content (e.g., a text, an image, a video, an icon, and a symbol).

The bracket 230 may include an insulation material, and may provide a space in which the display 220 may be seated. According to an embodiment, a bonding material may be applied to a partial area of the bracket 230 or the bracket 230 may include a bonding layer such that the display 220 may be fixed to the bracket 230. According to various embodiments, the bracket 230 may include at least one opening. According to an embodiment, some elements of the electronic device 200 may be aligned with at least one hole formed in the cover window 210 through at least one opening formed in the bracket 230. For example, the camera 251 may be aligned with the camera hole 211 of the cover window 210 through a first opening 231 formed in the bracket 230, the receiver 253 may be aligned with the receiver hole 213 of the cover window 210 through a second opening 233 formed in the bracket 230, and the IR sensor 255 may be aligned with the IR sensor hole 215 of the cover window 210 through a third opening 235 formed in the bracket 230.

The printed circuit board may be disposed under the bracket 230. Various electronic components may be mounted on the printed circuit board. For example, at least one electronic element and circuit lines may be mounted on the printed circuit board, and at least some of them may be electrically connected with each other. The electronic components, for example, may include a processor 257, a memory 258, or functional modules (e.g., the camera 251, the receiver 253, and the IR sensor 255).

The processor 257 may execute operations or data processing related to the control and/or communication of at least one other element of the electronic device 200. The processor 257 may control a plurality of hardware or software components connected to the processor 257 by driving an operating system or an application program and perform a variety of data processing or calculations. The processor 257 may include one or more of a central processing unit (CPU), an application processor (AP), or a communication processor (CP). The processor 257 may be implemented by a System on Chip (SoC).

The memory 258 may include a volatile and/or nonvolatile memory. The memory 258, for example, may store a command or data related to at least one other element of the electronic device 200. According to an embodiment, the memory 258 may store software and/or a program 1340.

The functional module may perform at least one of the functions provided by the electronic device 200. For example, the functional modules may include a camera 251 configured to perform a photographing function, a receiver 253 (or a speaker) configured to output sound, or an IR sensor 255 configured to detect a proximity of an object or an intensity of illumination of a peripheral area.

According to various embodiments, the printed circuit board may be integrally formed, or a plurality of printed circuit boards may be arranged. The drawing illustrates a state in which a first printed circuit board 241 and a second printed circuit board 243 are provided. According to an embodiment, the first printed circuit board 241 and the second printed circuit board 243 may be electrically connected with each other.

The housing 260 may fix and support the elements of the electronic device 200. According to an embodiment, the display 220, the bracket 230, and the printed circuit board may be sequentially stacked and may be seated on the housing 260. As another example, at least one of the functional modules may be seated in and fixed to the housing 260.

The housing 260 may include a front surface, a rear surface, and a side surface partially surrounding at least a portion of a space between the front surface and the rear surface. According to an embodiment, the housing 260 may have an opening that passes through the front surface and the rear surface of the housing 260 such that the battery 259 may be attached to and detached from the housing 260, but the present disclosure is not limited thereto. In some embodiments, the battery 259 may be integrally formed with the electronic device 200 and the opening passing through the front surface and the rear surface of the housing 260 may not be formed.

The battery 259 may supply electric power to the elements included in the electronic device 200. As an example, the battery 259 may be electrically connected to the printed circuit board to supply electric power to the electronic components mounted on the printed circuit board.

The rear cover 270 may define a rear external appearance of the electronic device 200. For example, the rear cover 270 may be coupled to one surface (e.g., a rear surface) of the housing 260 to cover the rear surface of the housing 260. According to various embodiments, the rear cover 270 may be detachably mounted on the housing 260.

Figure 3:
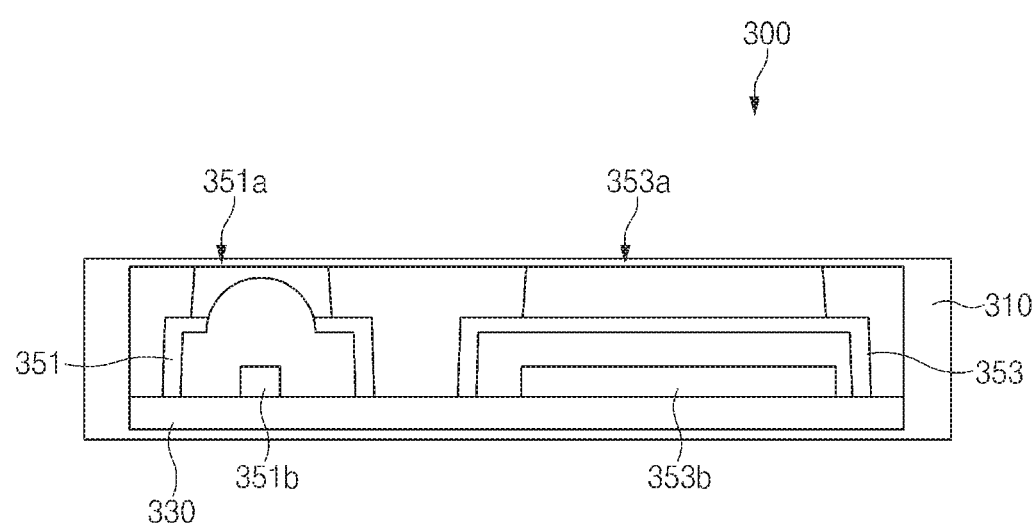
FIG. 3 is a view for explaining a configuration of an IR sensor according to an embodiment.

FIG. 3 is a view for explaining a configuration of an IR sensor according to an embodiment.

Referring to FIG. 3, the IR sensor 300 may include a substrate 330, a light emitting part 351, and a light receiving part 353. The substrate 330 may support the light emitting part 351 and the light receiving part 353, and various circuits and terminals may be installed in the substrate 330 such that a voltage may be applied to the light emitting part 351 and a detection signal may be applied to the light receiving part 353.

The light emitting part 351 may be mounted on one side of an upper surface of the substrate 330, and may include a light emitting element 351*b* that may irradiate light (e.g., an infrared ray) of a specific wavelength band to a subject, and a first hole 351*a* that functions as a passage such that the light irradiated from the light emitting element 351*b* may be discharged to the outside through the passage. The light emitting element 351*b* may be an infrared ray LED.

The light receiving part 353 may be mounted on an opposite side of the upper surface of the substrate 330, and may include a light emitting element 353*b* that may receive light reflected by the subject and a second hole 353*a* that functions as a passage such that the light reflected by the subject may be input to the interior of the IR sensor 300.

According to various embodiments, the light emitting part 351 and the light receiving part 353 may include lens units that are mounted on upper sides of the light emitting element 351*b* and the light receiving element 353*b* to surround the light emitting element 351*b* and the light receiving element 353*b*, respectively. The lens units may be formed of a transparent or translucent material such as silicon, epoxy, acryl, glass, or sapphire, and may be formed of various transparent or translucent materials, such as transparent encapsulation materials, transparent electrode materials, and transparent insulation materials.

According to an embodiment, the light emitting part 351 and the light receiving part 353 may be disposed on the substrate 330 to be adjacent to each other, and may be formed in a form of one package by a case 310. The case 310 has a shape surrounding the light emitting part 351 and the light receiving part 353 at once, and may include openings corresponding to the first hole 351*a* of the light emitting part 351 and the second hole 353*a* of the light receiving part 353 at upper ends of the light emitting part 351 and the light receiving part 353, respectively. Further, the case 310 may have a blocking wall that blocks the light emitting part 351 and the light receiving part 353 from each other to prevent the light generated by the light emitting element 351*b* of the light emitting part 351 from being directly delivered to the light receiving element 353*b* of the light receiving part 353. In some embodiments, the IR sensor 300 may not include the case 310.

According to an embodiment, if the light generated by the light emitting element 351*b* is discharged to the outside through the first hole 351*a* and the discharged light is reflected by the subject and is input to the interior of the IR sensor 300 through the second hole 353*a*, the light receiving element 353*b* may detect the input light to detect a proximity of the subject. Further, if the light input from an external light source is input to the interior of the IR sensor 300 through the second hole 353*a*, the light receiving element 353*b* may detect the input light to detect an intensity of illumination of a peripheral area.

Figure 4A:
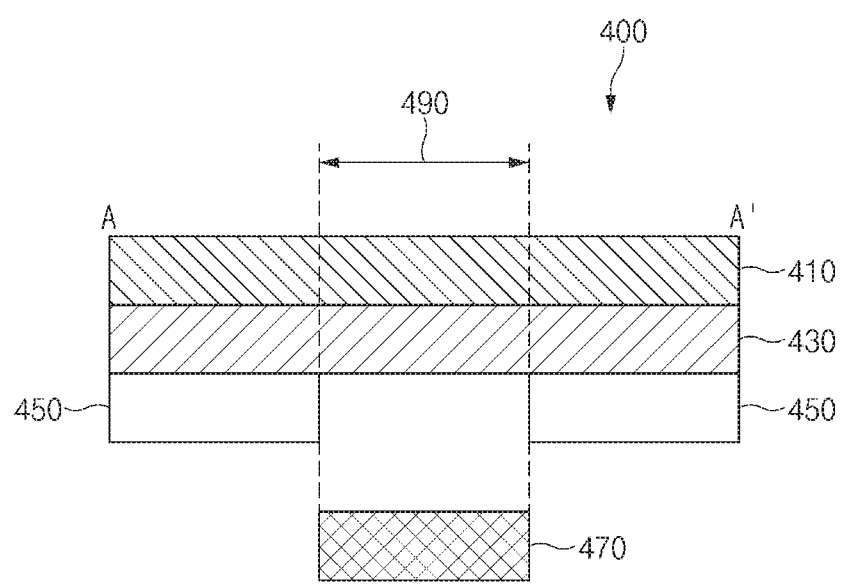
FIG. 4A is a view schematically illustrating a section of FIG. 2A, which is taken along line A-A', for explaining a configuration of a cover window according to an embodiment.

FIG. 4A is a view schematically illustrating a section of FIG. 2A, which is taken along line A-A', for explaining a configuration of a cover window according to an embodiment, FIG. 4B is a view illustrating a CIE LAB color coordinate in an IR sensor hole area and a peripheral area according to an embodiment, and FIG. 4C is a view for explaining a deposition structure of a color layer according to an embodiment.

Referring to FIGS. 4A to 4C, the cover window 400 may include a glass layer 410, a color layer 430, and a black masking layer 450 (or an opaque layer). The glass layer 410, the color layer 430, and the black masking layer 450 may be sequentially stacked. The glass layer 410, for example, may be formed at an outskirt of an electronic device (e.g., the electronic device 100), and may function to protect the electronic device from an external impact. The glass layer 410 may be formed of a transparent material (e.g., glass).

The color layer 430 may be provided such that light of a specific wavelength band may be introduced into and discharged from the color layer 430. The color layer 430 may be formed such that light of an infrared area (e.g., an area including a wavelength of about 940 nm) is input at a specific ratio (e.g., 30%) or more, and may be formed such that light of a visual light or visual ray area (e.g., an area including a wavelength of about 550 nm) is input at a specific ratio (e.g., 10%) or less.

According to an embodiment, as illustrated in FIG. 4B, a difference between a reflective color feeling of the IR sensor hole area 490 and a reflective color feeling of a peripheral part may be a specific color difference value ($\Delta E$) (e.g., 3 to 3.75) or less when the difference is measured with a CIE LAB color coordinate. In detail, when a first color 401 is realized in the color layer 430, a reflective index $L^*$, a first chromaticity coordinate $a^*$, and a second chromaticity coordinate $b^*$ of a first area 405 (e.g., a peripheral part of the IR sensor hole area 490) may be 30.71, −0.02, and −2.2, respectively, and a reflective index, a first chromaticity coordinate, and a second chromaticity coordinate of a second area 406 (e.g., the IR sensor hole area 490) may be 30.8, −0.03, and 2.31, respectively. Accordingly, when the first color 401 is realized in the color layer 430, a color difference between the first area 405 and the second area 406 may be 0.14. When the second color 402 is realized in the color layer 430, the reflective index, the first chromaticity coordinate, and the second chromaticity coordinate of the first area 405 may be 80.52, −1.05, and 1.16, respectively, and the reflective index, the first chromaticity coordinate, and the second chromaticity coordinate of the second area 406 may be 80.39, −1.22, and 0.77, respectively. Accordingly, when the second color 402 is realized in the color layer 430, a color difference between the first area 405 and the second area 406 may be 0.44. When the third color 403 is realized in the color layer 430, the reflective index, the first chromaticity coordinate, and the second chromaticity coordinate of the first area 405 may be 69.78, 3.05, and 12.94, respectively, and the reflective index, the first chromaticity coordinate, and the second chromaticity coordinate of the second area 406 may be 70.04, 2.94, and 12.82, respectively. Accordingly, when the third color 403 is realized in the color layer 430, a color difference between the first area 405 and the second area 406 may be 0.31. Further, when the fourth color 404 is realized in the color layer 430, the reflective index, the first chromaticity coordinate, and the second chromaticity coordinate of the first area 405 may be 59.09, −6.69, and −24.18, respectively, and the reflective index, the first chromaticity coordinate, and the second chromaticity coordinate of the second area 406 may be 59.24, −6.72, and −24.07, respectively. Accordingly, when the fourth color 404 is realized in the color layer 430, a color difference between the first area 405 and the second area 406 may be 0.19.

The above-mentioned color difference between the first area 405 and the second area 406 is not limited thereto, but may have various values according to colors that are to be realized. For example, the color difference between the first area 405 and the second area 406 may be 0.14 or less. However, the color difference between the first area 405 and the second area 406 has to be the specific color difference (e.g., 3 to 3.75) or less, and the first area 405 and the second area 406 may have the same or similar external appearances. Further, the first color 401, the second color 402, the third color 403, and the fourth color 404 may be at least one of a black color, a silver color, a gold color, and a blue color.

According to an embodiment, the color layer 430 may be formed through deposition of an oxide or may be formed of a printed painting film. In the case of the deposition of an oxide, an oxide or a nitride such as $SiO_2$, $TiO_2$, $Al_2O_3$, $Nb_2O_5$, $MgF_2$, $Ti_2O_5$, $SnO_2$, ZnO, $Ta_2O_5$, MgO, $Si_3N_4$, ITO, AlN, AlON, TiN, $Ti_3O_5$, or $ZrO_2$ may be used. According to various embodiments, a metal thin film may be additionally deposited on the color layer 430 when the oxide is deposited. When the metal thin film is used, the thickness of the thin film may decrease to a quarter of the color layer 430 formed of an oxide thin film. Further, when the thin film is thick, there is a high possibility of generating a color deviation due to the deviation of the thicknesses of the thin films of the layers, but when the thickness of the thin film decreases due to use of the metal thin film, the color deviation of the color 430 may be improved. Further, because a defect of a thin film, such as a thin film crack, may be also improved when the thickness of the thin film decreases, it may be advantageous to use the metal thin film when various color feelings to be realized.

However, when the metal thin film is deposited thick for a desired color feeling, a transmissivity of light at a wavelength band (e.g., 550 nm/940 nm) for an operation of a sensor may not be secured so that the thickness of the metal thin film needs to be limited. As an embodiment, when the metal thin film is deposited, the thickness of the thin film may be a specific thickness (e.g., 0 to 50 nm) or less. As the thickness of the metal thin film is limited for a performance of a sensor, the insufficient color feeling may be compensated for by making the structures of the remaining oxide layers different.

The metal thin film may be formed of In, Al, Ag, Sn, or Ag. As an example, when the metal thin film is formed of indium (In), the color layer 430 may be advantageous in increasing a luminance feeling while the color layer 430 maintains a thickness of a specific value or less. Further, in the case of deposition using indium, flows of current may be prevented by forming a deposition layer in an isolation form (e.g., an island form). In the case of a printed painting film, the color layer 430 may be formed by using a plurality of color inks, curing agents, diluents, or solvents for emission of colors.

According to various embodiments, the color layer 430 may deposited with a plurality of layers. For example, the color layer 430 may realize a specific transmissivity and a specific reflective index by repeatedly stacking a high refractivity material and a low refractivity material, and may be advantageous in realizing a specific color. When light passes through two different media, it may pass through a border of the two media or may be reflected on the border. The phenomenon is caused by an optical difference between two media, for example, the refractivity or absorption rates of materials, and in the case of a multilayered thin film, an offset interference or a constructive interference of light may occur on an interface of thin films according to the refractivity, absorption rates, or thicknesses of the thin films. Accordingly, the transmissivity and the reflective indexes of light for the wavelengths may be adjusted and a desired color may be implemented.

In more detail, as illustrated in FIG. 4C, in the color layer 430, the first color 401 may be realized by depositing $TiO_2$ on a first layer, $SiO_2$ on a second layer, and $TiO_2$ on a third layer such that $TiO_2$ on the first layer, $SiO_2$ on the second layer, and $TiO_2$ on the third layer have a thickness of 40 Å to 80 Å, a thickness of 190 Å to 290 Å, and a thickness of 140 Å to 180 Å, respectively. In the color layer 430, the second color 402 may be realized by depositing $Al_2O_3$ on a first layer, In on a second layer, $Al_2O_3$ on a third layer, and $TIO_2$ on a fourth layer such that $Al_2O_3$ on the first layer, In on the second layer, $Al_2O_3$ on the third layer, and $TIO_2$ on the fourth layer have a thickness of 16 Å to 24 Å, a thickness of 300 Å to 420 Å, a thickness of 160 Å to 240 Å, and 16 Å to 24 Å, respectively. In the color layer 430, the third color 403 may be realized by depositing $TiO_2$ on a first layer, In on a second layer, $TIO_2$ on a third layer, $Al_2O_3$ on a fourth layer, and $TiO_2$ on a fifth layer such that $TiO_2$ on the first layer, In on the second layer, $TIO_2$ on the third layer, $Al_2O_3$ on the fourth layer, and $TiO_2$ on the fifth layer have a thickness of 220 Å to 340 Å, a thickness of 380 Å to 580 Å, a thickness of 560 Å to 840 Å, 120 Å to 180 Å, and 16 Å to 24 Å, respectively. Further, in the color layer 430, the fourth color 404 may be realized by depositing $TiO_2$ on a first layer, $Al_2O_3$ on a second layer, In on a third layer, $TiO_2$ on a fourth layer, $Al_2O_3$ on a fifth layer, and $TiO_2$ on a sixth layer such that $TiO_2$ on the first layer, $Al_2O_3$ on the second layer, In on the third layer, $TiO_2$ on the fourth layer, $Al_2O_3$ on the fifth layer, and $TiO_2$ on the sixth layer have a thickness of 560 Å to 840 Å, a thickness of 16 Å to 24 Å, a thickness of 190 Å to 290 Å, 240 Å to 360 Å, 160 Å to 240 Å, and 16 Å to 24 Å, respectively When the color layer 430 is formed through deposition of an oxide and a metal thin film, a transmissivity of light of a specific wavelength band in a multilayered thin film structure may be adjusted by utilizing a refractivity, a reflective index, or a transmissivity of the deposition layer, and when the color layer 430 is formed of a printed painting film, a transmissivity of light of a specific wavelength band may be adjusted by adjusting a transmissivity of a color mixing ink and a thickness of a printed painting film.

Accordingly, in a partial area (e.g., the IR sensor hole area 490) of the cover window 400 which the IR sensor 470 faces, light of an infrared ray area (e.g., an area including a wavelength of about 940 nm) may be input at a specific ratio (e.g., 0.2:1 or 20%) or more such that the function of the IR sensor 470 may be supported, and light of a visible light or visual ray area (e.g., an area including a wavelength of about 550 nm) may be input at a specific ratio (e.g., 0.15:1 or 15%) or less such that the partial area of the cover window 400 may be viewed to have an external appearance that is substantially the same as or similar to a peripheral area.

According to an embodiment, the color layer 430 may have a smaller thickness when the color layer 430 is realized through deposition than when the color layer 430 is realized through printing. For example, a thickness of the color layer 430 realized through deposition may be 10 nm to 500 nm, and a thickness of the color layer 430 realized through printing may be 5 μm to 50 μm.

The black masking layer 450 may include a printed painting film that is opaquely printed such that a non-display area that is adjacent to a display area of a display (e.g., the display 130) is not exposed to the outside. The black masking layer 450, for example, may be formed in a black matrix (BM) area. The black masking layer 450 may not be formed in a partial area of the cover window 400, for example, the IR sensor hole area 490.

Figure 5:
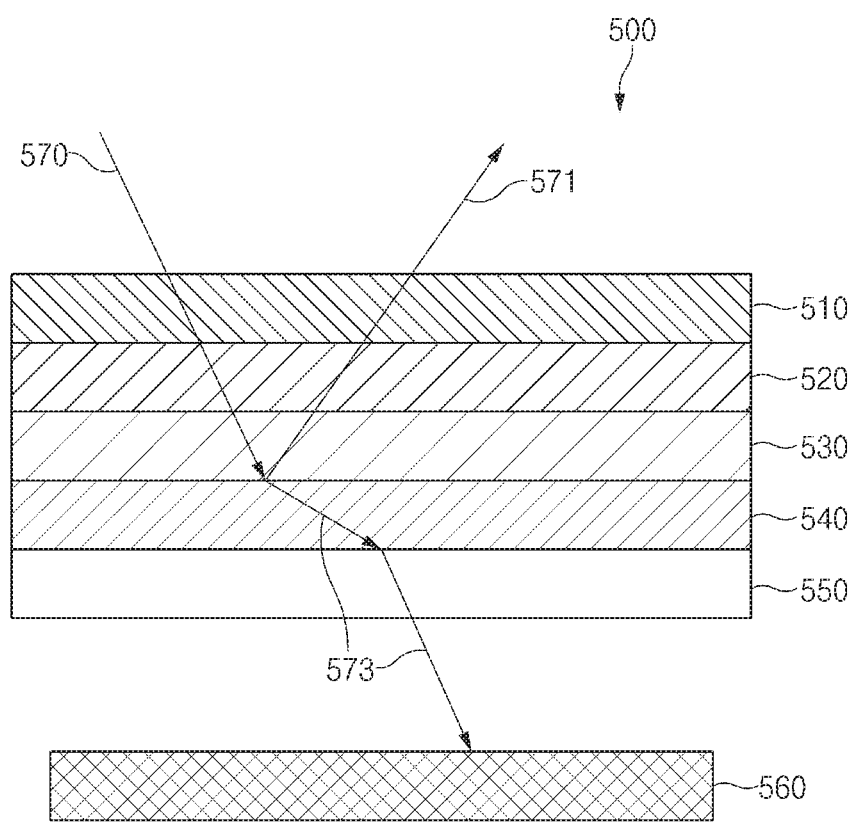
FIG. 5 is a view illustrating a stack structure of a cover window, to which light having a specific wavelength band is input, according to an embodiment.

FIG. 5 is a view illustrating a stack structure of a cover window, to which light having a specific wavelength band is input, according to an embodiment. FIG. 5 illustrates a stack structure of a partial area (e.g., the IR sensor hole area 490) of the cover window 500.

Referring to FIG. 5, the cover window 500 may include a color layer including a glass layer 510 and a plurality of deposition layers. The plurality of deposition layers may include at least one oxide deposition layer and at least one metal thin film deposition layer. The plurality of deposition layers may have a specific transmissivity and a specific reflective index by stacking materials having different refractivity in a specific sequence, and may have a specific color. For example, as illustrated in the drawing, the IR sensor 560 may detect an infrared ray 573 by reflecting a visual ray 571 of light 570 that is input to the cover window 500 and allowing an infrared ray 573 to pass through the IR sensor 560.

The drawing illustrates a state in which a first oxide deposition layer 520, a metal thin film deposition layer 530, a second oxide deposition layer 540, and a third oxide deposition layer 550 are sequentially stacked under the glass layer 510. As an example, the first oxide deposition layer 520 and the third oxide deposition layer 550 may be formed of a material having a refractivity of a specific value or less, and the second oxide deposition layer 540 may be formed of a refractivity of a specific value or more. The first oxide deposition layer 520 and the third oxide deposition layer 550 may include the same or similar materials. As an example, the first oxide deposition layer 520 and the third oxide deposition layer 550 may include $Al_2O_3$. Further, the second oxide deposition layer 540 may include $TiO_2$. According to an embodiment, the metal thin film deposition layer 530 may include indium, and may have a thickness of a specific value (e.g., 20 nm) or less.

Figure 6A:
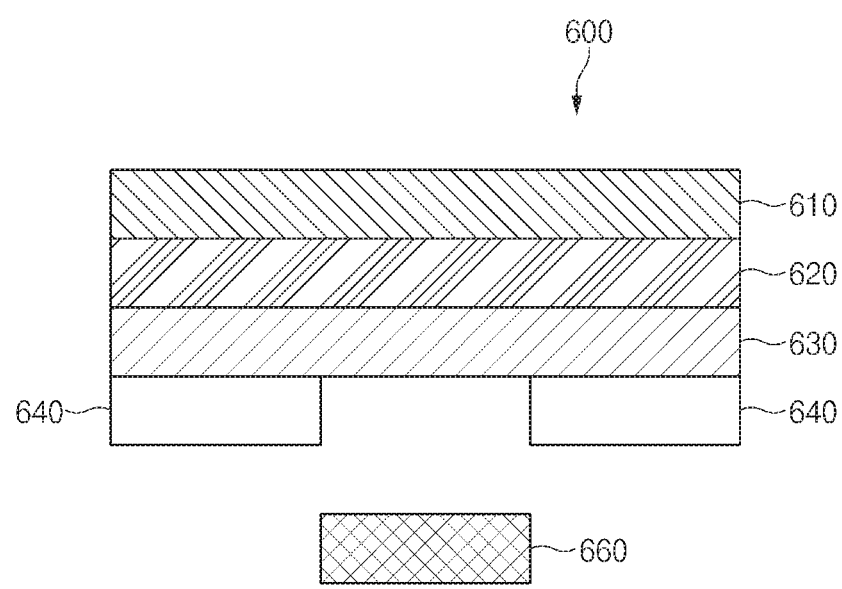
FIG. 6A is a view illustrating a stack structure of a cover window in which a film layer is disposed according to an embodiment.
Figure 6B:
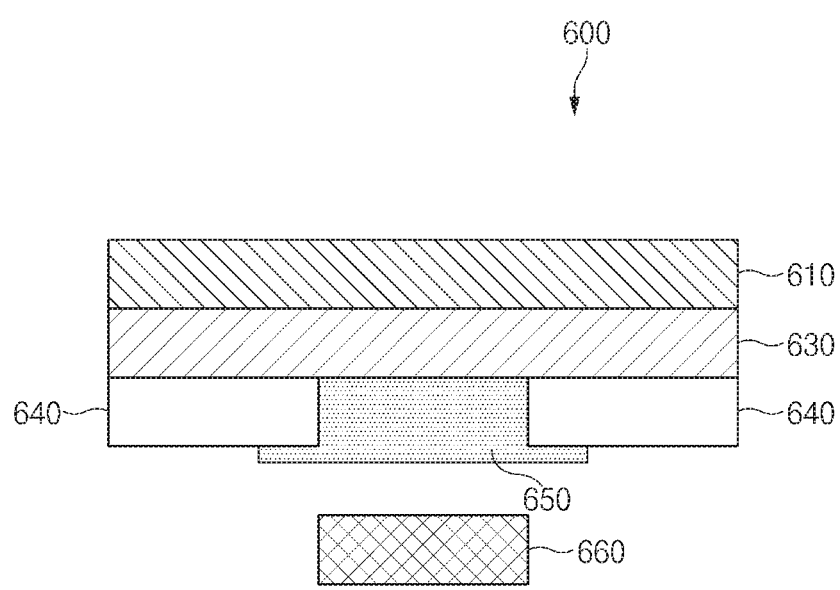
FIG. 6B is a view illustrating a stack structure of a cover window in which an IR ink layer is disposed according to an embodiment.
Figure 6C:
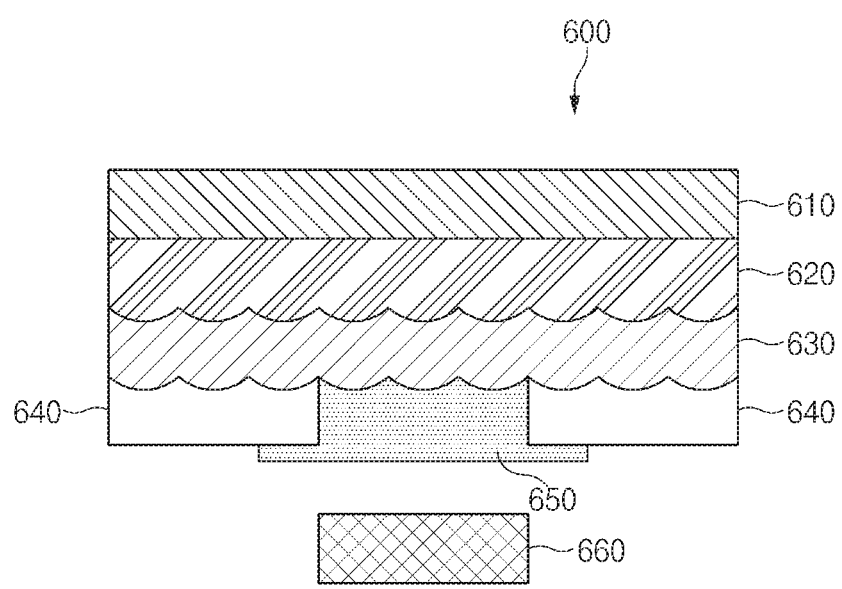
FIG. 6C is a view illustrating a stack structure of a cover window including a film layer in which a molding pattern is formed according to an embodiment.

FIG. 6A is a view illustrating a stack structure of a cover window in which a film layer is disposed according to an embodiment, FIG. 6B is a view illustrating a stack structure of a cover window in which an IR ink layer is disposed according to an embodiment, and FIG. 6C is a view illustrating a stack structure of a cover window including a film layer in which a molding pattern is formed according to an embodiment.

Referring to FIGS. 6A to 6C, the cover window 600 may include at least one of a film layer 620 and an IR ink layer 650 in addition to the glass layer 610, the color layer 630, and the block masking layer 640. As illustrated in FIGS. 6A and 6C, the cover window 600 may further include a film layer 620 between the glass layer 610 and the color layer 630. The film layer 620 may include a film in which a letter, a number, a symbol, or a figure is printed by using an ink (a paint) of an opaque color.

According to an embodiment, the film layer 620 may realize a specific pattern. For example, as illustrated in FIG. 6C, a molding pattern may be formed in the film layer 620 through UV molding. When the film layer 620 having a molding pattern is included in the cover window 600, the molding pattern may extend not only to an IR sensor hole area (e.g., the IR sensor hole area 490) but also to a peripheral area to achieve an integral external appearance.

The IR ink layer 650 may be formed by using an IR ink. As illustrated in FIGS. 6B and 6C, the IR ink layer 650 may be disposed to be aligned with an empty space between the black masking layers 640, that is, in the IR sensor hole area. The IR ink layer 650 may be disposed to adjust a transmissivity of light of a specific wavelength band. For example, the IR ink layer 650 may be disposed to increase a transmissivity of an infrared ray of the color layer 630 to a specific value or more or decrease a transmissivity of a visual ray to a specific value or less. When the color layer 630 is formed of a printed painting film, a transmissivity of the visual ray of the color layer 630 may be adjusted by adjusting a transmissivity of a color mixing ink and a thickness of a printed painting film, and the transmissivity of an infrared ray and a visual ray may be adjusted by adjusting a color of the BM area and by additionally using the IR ink layer 650.

According to an embodiment, the IR ink used for the IR ink layer 650 may have different composition ratios according to specifications. For example, because a transmissivity of a deposition layer or a printed painting film forming the color layer 630 is different, the transmissivity of the IR ink also may be determined at a composition ratio corresponding thereto. Further, the IR ink layer 650 may function to protect the color layer 630 from the outside. As another example, when the deposition layer or the printed painting film forming the color layer 630 satisfies a transmissivity of light of a specific wavelength band, the IR ink layer 650 may include a transparent ink for protecting the IR sensor hole area.

Figure 7A:
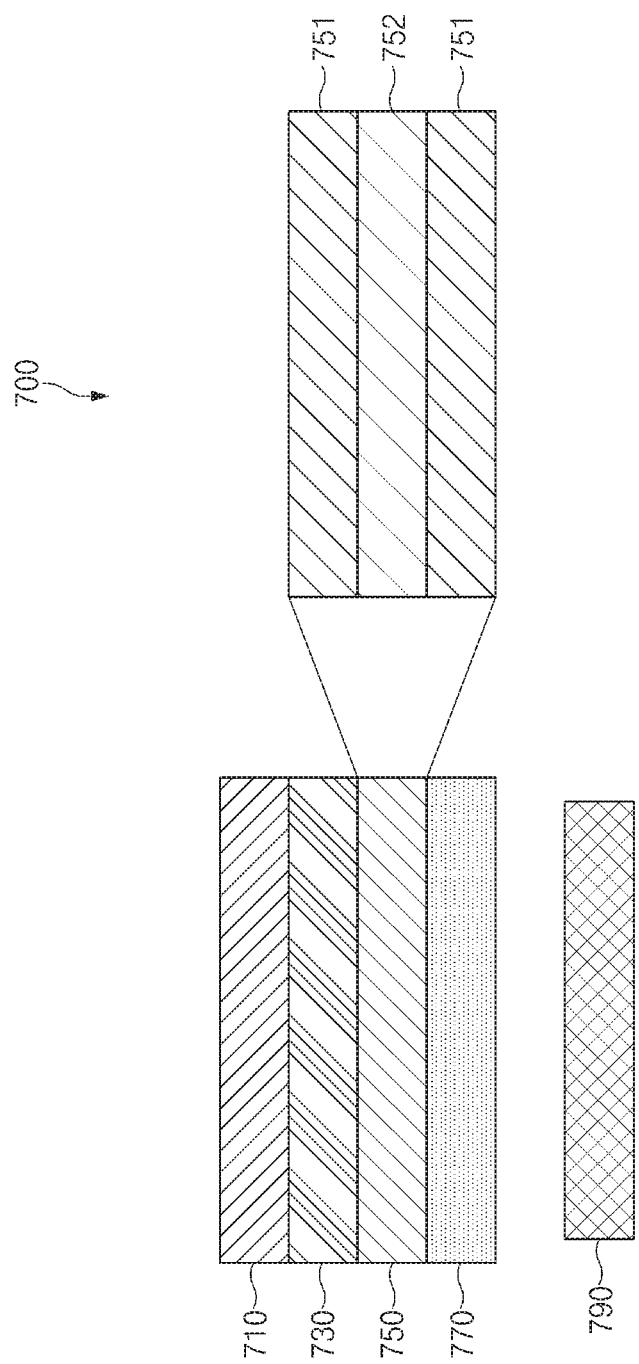
FIG. 7A is a view illustrating a first stack structure of a cover window according to an embodiment.
Figure 7B:
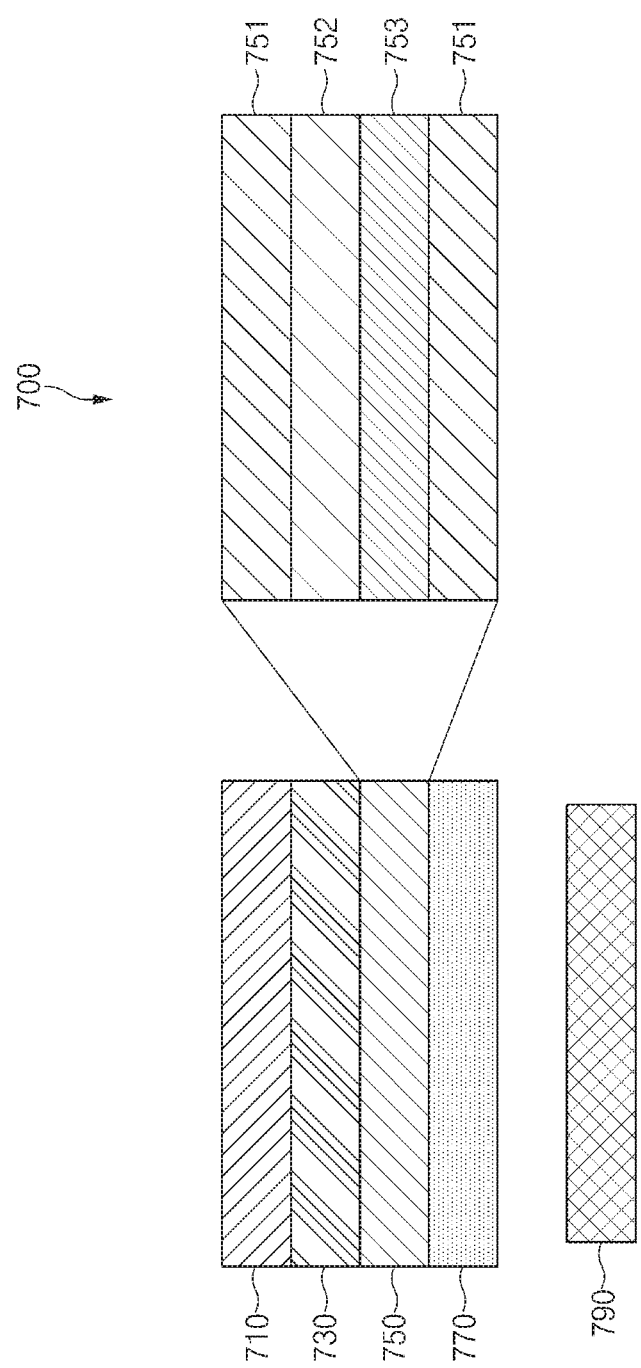
FIG. 7B is a view illustrating a second stack structure of a cover window according to an embodiment.
Figure 7C:
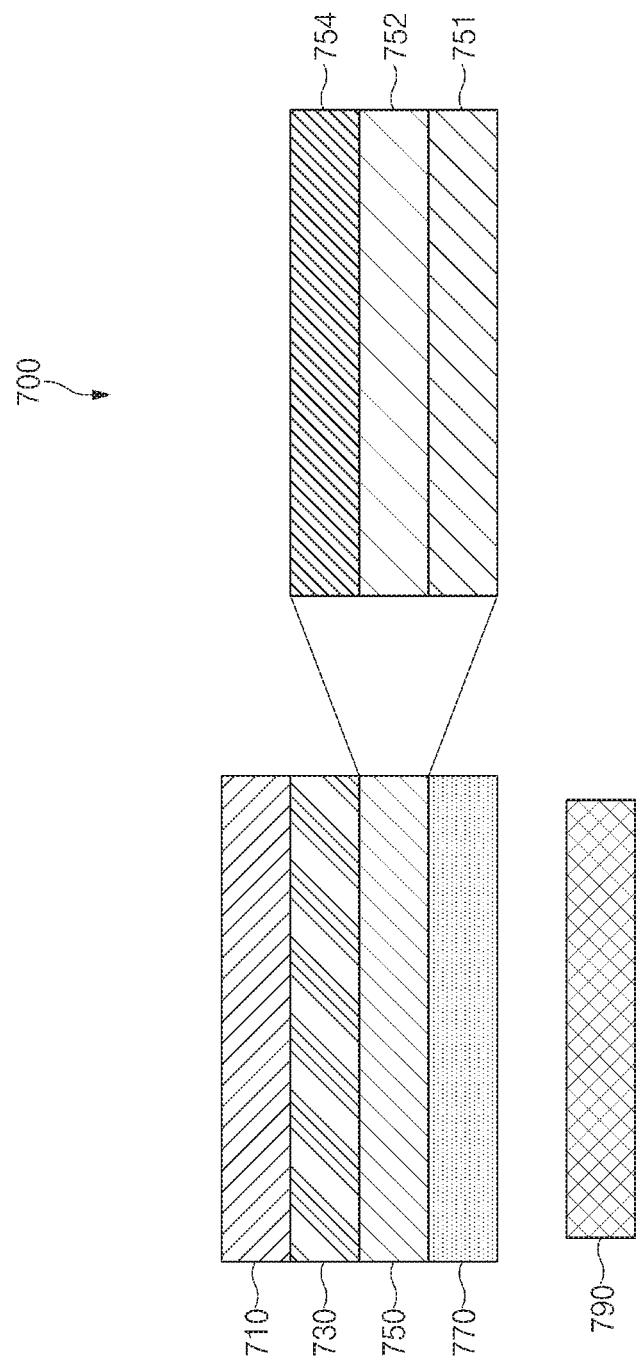
FIG. 7C is a view illustrating a third stack structure of a cover window according to an embodiment.
Figure 7D:
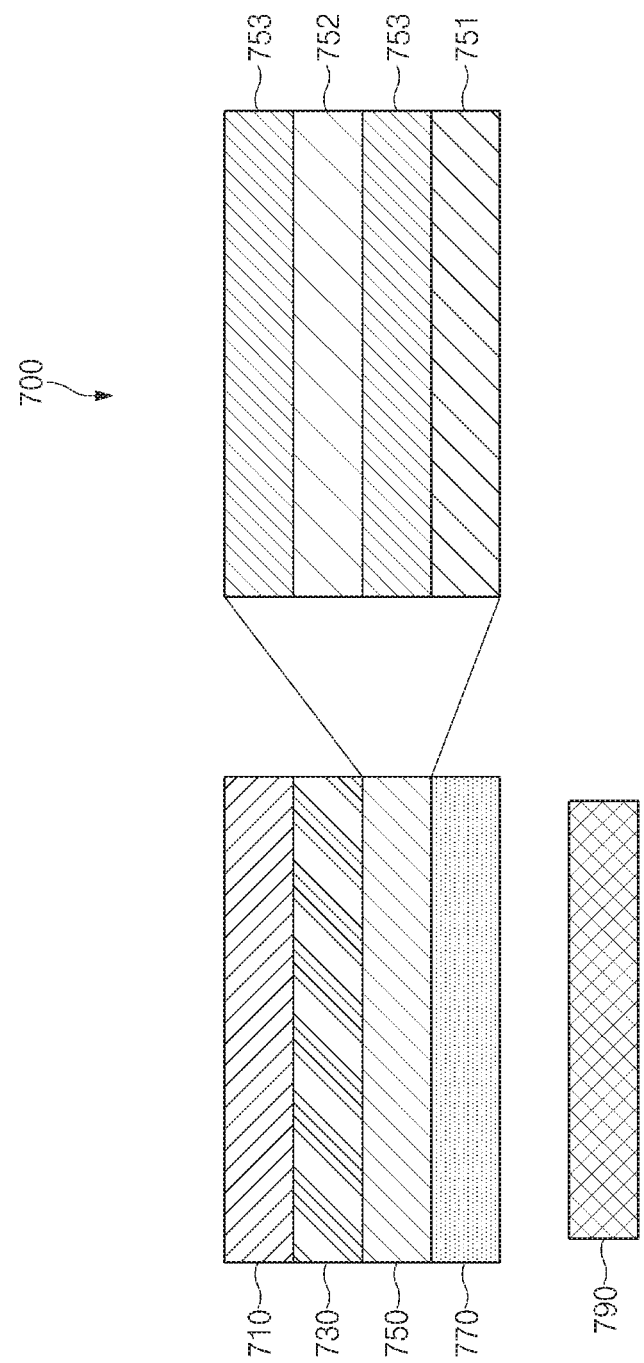
FIG. 7D is a view illustrating a fourth stack structure of a cover window according to an embodiment.
Figure 7E:
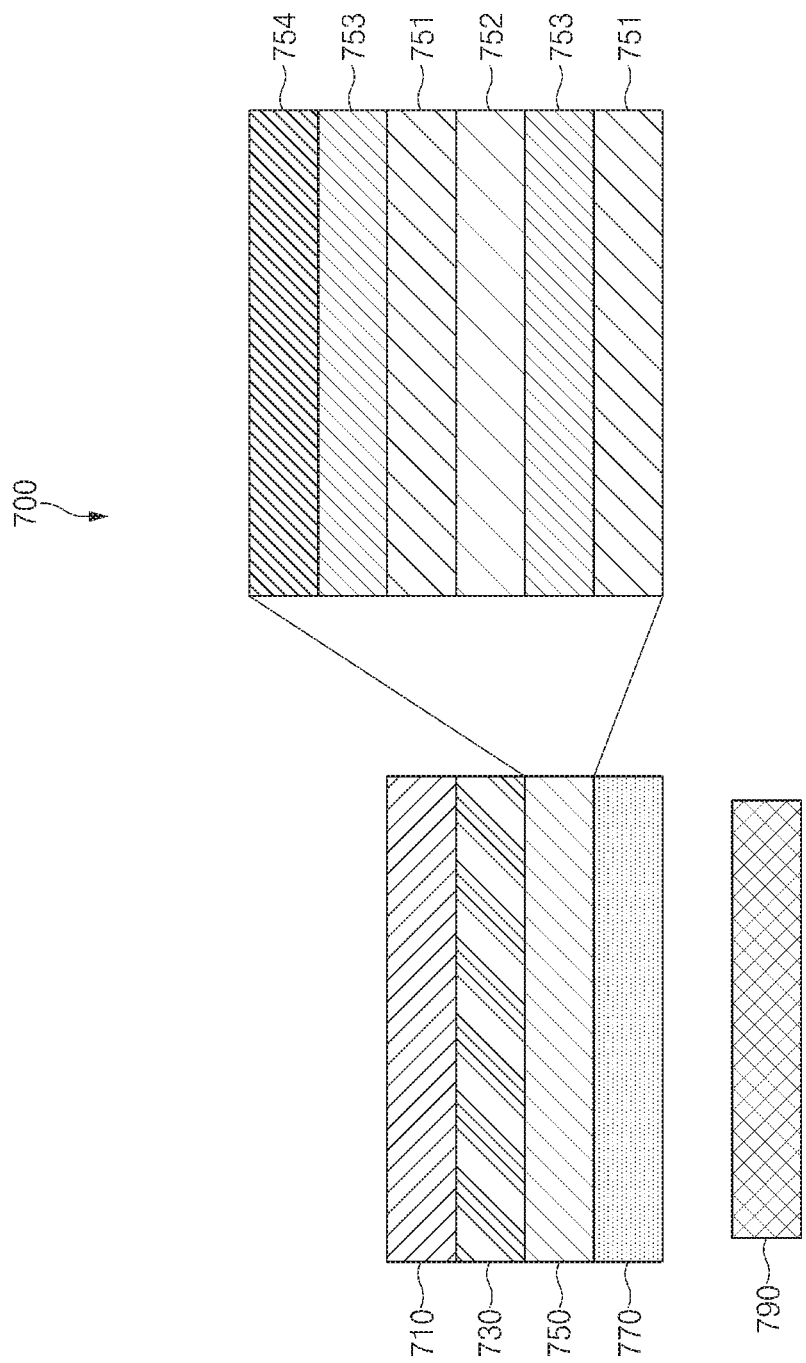
FIG. 7E is a view illustrating a fifth stack structure of a cover window according to an embodiment.
Figure 7F:
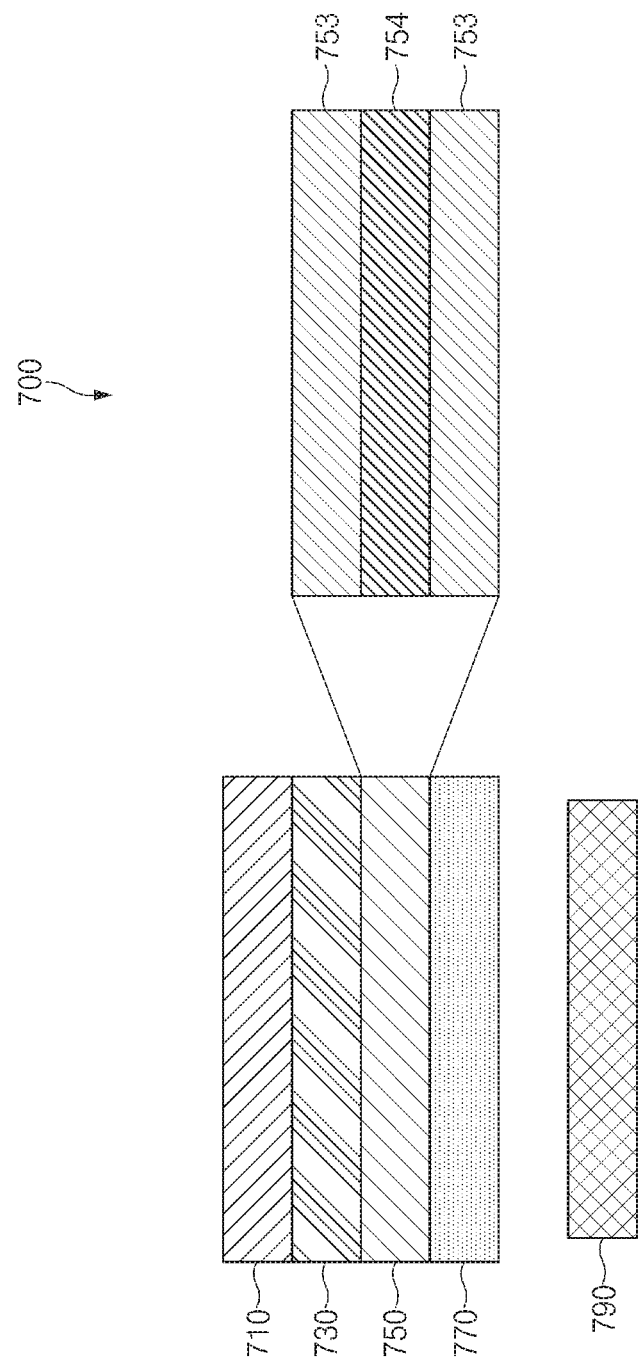
FIG. 7F is a view illustrating a sixth stack structure of a cover window according to an embodiment.
Figure 7G:
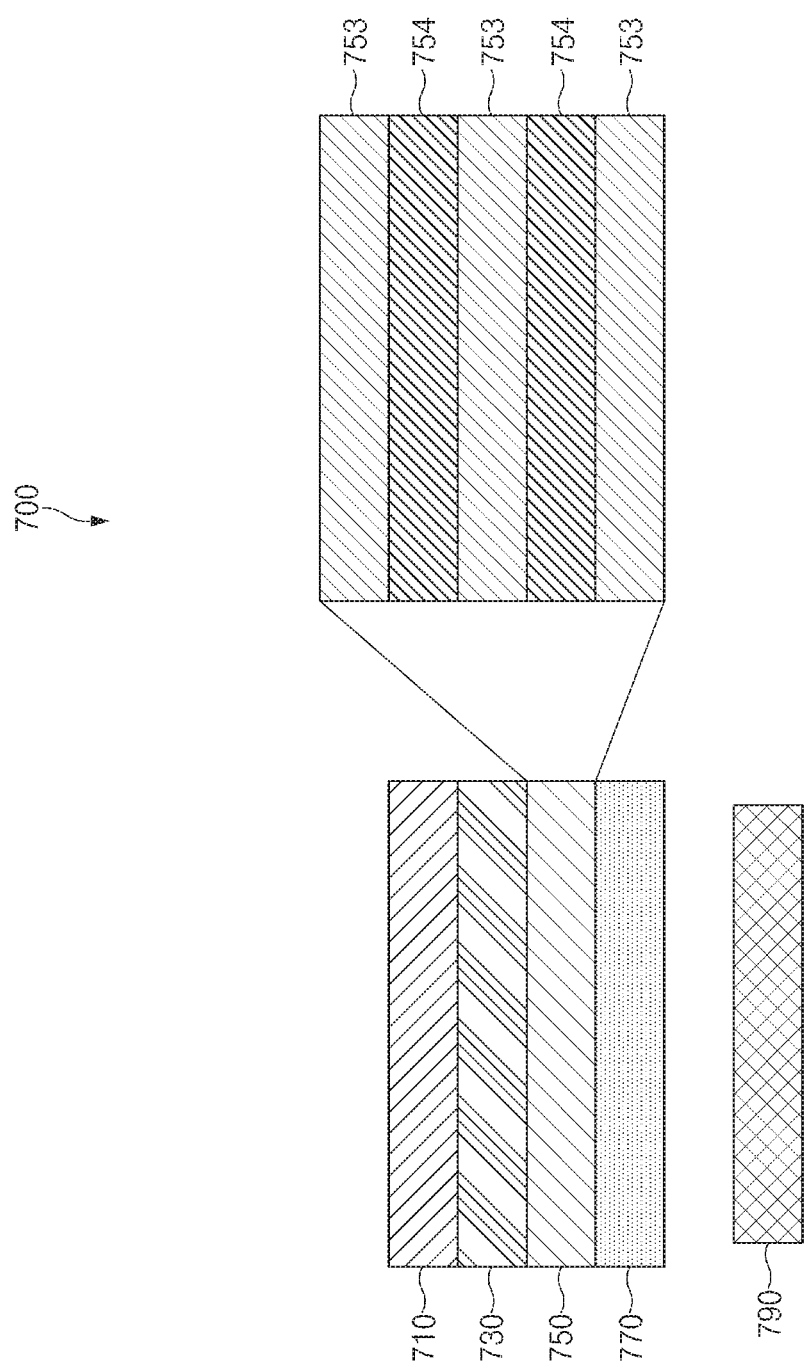
FIG. 7G is a view illustrating a seventh stack structure of a cover window according to an embodiment.

FIG. 7A is a view illustrating a first stack structure of a cover window according to an embodiment, FIG. 7B is a view illustrating a second stack structure of a cover window according to an embodiment, FIG. 7C is a view illustrating a third stack structure of a cover window according to an embodiment, FIG. 7D is a view illustrating a fourth stack structure of a cover window according to an embodiment, FIG. 7E is a view illustrating a fifth stack structure of a cover window according to an embodiment, FIG. 7F is a view illustrating a sixth stack structure of a cover window according to an embodiment, and FIG. 7G is a view illustrating a seventh stack structure of a cover window according to an embodiment. FIGS. 7A to 7G illustrate a stack structure of a partial area (e.g., the IR sensor hole area 490) of the cover window 700.

Referring to FIGS. 7A to 7G, the cover window 700 may include a glass layer 710, a film layer 730, a color layer 750, and an IR ink layer 770. However, the configuration of the cover window 700 is not limited thereto. In some embodiments, the cover window 700 may exclude at least one of the film layer 730 and the IR ink layer 770.

The cover window 700 may have different colors according to method of forming the color layer 750 and used materials. According to an embodiment, the color layer 750 may be formed of at least one oxide (or nitride) deposition layer and at least one metal thin film deposition layer.

According to an embodiment, the color layer 750 may be formed of one oxide (or nitride) deposition layer and one metal thin film deposition layer. As illustrated in FIG. 7A, the color layer 750 may have a structure in which a metal thin film deposition layer 752 is disposed between first oxide deposition layers 751. As an example, when the first oxide deposition layers 751 include $TiO_2$ and the metal thin film deposition layer 752 includes an indium metal thin film, the color layer 750 may realize a first color.

According to an embodiment, the color layer 750 may be formed of two oxide (or nitride) deposition layers or more and one metal thin film deposition layer. As illustrated in FIG. 7B, the color layer 750 may have a form in which the first oxide deposition layer 751, the metal thin film deposition layer 752, a second oxide deposition layer 753, and the first oxide deposition layer 751 are sequentially stacked. As an example, when the first oxide deposition layers 751 include $Al_2O_3$, the second oxide deposition layer 753 includes $TiO_2$, and the metal thin film deposition layer 752 includes an indium metal thin film, the color layer 750 may realize a second color.

As illustrated in FIG. 7C, the color layer 750 may have a form in which a third oxide deposition layer 754, the metal thin film deposition layer 752, and the first oxide deposition layer 751 are sequentially stacked. As an example, when the first oxide deposition layers 751 include $Al_2O_3$, the third oxide deposition layer 754 includes $SiO_2$, and the metal thin film deposition layer 752 includes an indium metal thin film, the color layer 750 may realize a second color.

As illustrated in FIG. 7D, the color layer 750 may have a form in which the second oxide deposition layer 753, the metal thin film deposition layer 752, the second oxide deposition layer 753, and the first oxide deposition layer 751 are sequentially stacked. As an example, when the first oxide deposition layers 751 include $Al_2O_3$, the second oxide deposition layer 753 includes $TiO_2$, and the metal thin film deposition layer 752 includes an indium metal thin film, the color layer 750 may realize a third color. As another example, as illustrated in FIG. 4C, when the first oxide deposition layers 751 include $TiO_2$, the second oxide deposition layer 753 includes $Al_2O_3$, and the metal thin film deposition layer 752 includes an indium metal thin film, the color layer 750 may realize a second color.

As illustrated in FIG. 7E, the color layer 750 may have a form in which the third oxide deposition layer 754, the second oxide deposition layer 753, the first oxide deposition layer 751, the metal thin film deposition layer 752, the second oxide deposition layer 753, and the first oxide deposition layer 751 are sequentially stacked. As an example, when the first oxide deposition layers 751 include $Al_2O_3$, the second oxide deposition layer 753 includes $TiO_2$, the third oxide deposition layer 754 includes $SiO_2$, and the metal thin film deposition layer 752 includes an indium metal thin film, the color layer 750 may realize a third color.

As described above, because the color layer 750 includes a plurality of oxide deposition layers on at least one of on and under the metal thin film deposition layer 752, various colors may be realized. As the locations and the number of the oxide deposition layers are differently determined even though the type of the oxide deposition layers is the same, the color layer 750 may be realized in different colors.

According to various embodiments, the color layer 750 may be formed of a printed painting film, and may be formed of at least one oxide (or nitride) deposition layer that does not include a metal thin film deposition layer. As an example, as illustrated in FIG. 7F, the color layer 750 may have a form in which the second oxide deposition layer 753, the third oxide deposition layer 754, and the second oxide deposition layer 753 are sequentially stacked. As another example, as illustrated in FIG. 7G, the color layer 750 may have a form in which the second oxide deposition layer 753, the third oxide deposition layer 754, the second oxide deposition layer 753, the third oxide deposition layer 754, and the second oxide deposition layer 753 are sequentially stacked. According to an embodiment, as illustrated in FIG. 4C, when the second oxide deposition layer 753 includes $TiO_2$ and the third oxide deposition layer 754 includes $SiO_2$, the color layer 750 may realize a fourth color. Further, the second oxide deposition layer 753 and the third oxide deposition layer 754 may be repeatedly stacked such that the color layer 750 realizes a fourth color. In this case, the color layer 750 may increase the number of stacked layers while the realized color is not changed.

According to an embodiment, when an oxide (or nitride) deposition layer is formed not to include a metal thin film deposition layer, the color layer 750 may realize a color through additional printing. As an example, as illustrated in FIG. 7F, if the color layer 730 is background black double-tone printed and shield black double-tone printed after being deposited with an oxide (nitride) and an IR ink layer 770 is formed by using a black IR ink, the color layer 730 may realize a fourth color. As another example, as illustrated in FIG. 7F, if the color layer 730 is background black double-tone printed and shield white quadruple-tone printed after being deposited with an oxide (nitride) and an IR ink layer 770 is formed by using a white IR ink, the color layer 730 may realize a fifth color.

In some embodiments, the color layer 730 may realize a fourth color by forming the IR ink layer 770 first by using a black IR ink while omitting formation of an oxide (or nitride) deposition layer and then performing black quadruple printing on the IR ink layer 770. In this case, after the IR ink layer 770 is formed, black quadruple printing may be performed after masking a partial area (e.g., the IR sensor hole area 490) of the IR ink layer 770, and masking may be removed after the black printing is performed.

The first color, the second color, the third color, the fourth color, and the fifth color may be at least one of a tint dark color, a silver color, a gold color, a black color, and a white color. However, the present disclosure is not limited the colors. The colors may be differently realized according to the type, the number, and the stack sequence of the oxide (or nitride) deposition layers, and the type, the number, and the stack sequence of the metal thin film deposition layers.

As described above, according to various embodiments, an electronic device (e.g., the electronic device 200) may include a housing (e.g., the housing 260) including a first surface facing a first direction, a second surface facing a second direction that is opposite to the first direction, and a side surface surrounding at least a portion of a space between the first surface and the second surface, a touch screen display (e.g., the display 220) disposed within the housing and exposed through a first area of the first surface, an optical sensor (e.g., the IR sensor 255) included within the housing, disposed under a second area of the first surface that is adjacent to the first area, and configured to receive and/or emit an infrared ray, and a processor (e.g., the processor 257) electrically connected to the display and the optical sensor. The first surface may include a substantially transparent glass layer (e.g., the glass layer 410), an opaque layer (e.g., the black masking layer 450) disposed between the glass layer and the second surface, and a color layer (e.g., the color layer 430) disposed between the opaque layer and the glass layer and forming at least a portion of a color exposed through the glass layer. The opaque layer may include an opening (e.g., the IR sensor hole 155), a location and a size of which correspond to at least a portion of the optical sensor when viewed from the first surface, and the optical sensor may receive and/or emit an infrared ray through the opening, the color layer, and the glass layer.

According to various embodiments, the color layer may have a thickness of 10 nm to 130 nm.

According to various embodiments, the color layer may have a thickness of 10 nm to 500 nm.

According to various embodiments, the color layer may have a thickness of 5 μm to 50 μm.

According to various embodiments, the color layer may include a first layer (e.g., the first oxide deposition layer 751) disposed between the glass layer and the opaque layer and having a first refractive index, a second layer (e.g., the second oxide deposition layer 753) disposed between the first layer and the opaque layer and having a second refractive index that is smaller than the first refractive index, and a third layer (e.g., the metal thin film deposition layer 752) disposed between the first layer and the second layer.

According to various embodiments, a ratio of a thickness of the first layer and a thickness of the second layer may be in a range between 0.48:1.09 to 7.33:16.50.

According to various embodiments, the first layer and the second layer may include at least one of $SiO_2$, $TiO_2$, $Al_2O_3$, $Nb_2O_5$, $MgF_2$, $Ti_2O_5$, $SnO_2$, ZnO, $Ta_2O_5$, MgO, $Si_3N_4$, ITO, AlON, TiN, $Ti_3O_5$, and $ZrO_2$, and the third layer may include at least one of In, Al, Ag, Sn, and Ag.

According to various embodiments, light of a first wavelength band may pass through the color layer at a first ratio or more, and light of a second wavelength band may pass through the color layer at a second ratio or less.

According to various embodiments, the first wavelength band may correspond to an infrared ray area including a wavelength of 940 nm, and the second wavelength band may correspond to a visual ray area including a wavelength of 550 nm.

According to various embodiments, the first ratio may be 20% and the second ratio may be 15%.

According to various embodiments, the third layer may have a thickness of 50 nm or less.

According to various embodiments, the color layer may be formed by using at least one of at least one color ink, a curing agent, a diluent, and a solvent.

According to various embodiments, the electronic device may further include at least one of a film layer (e.g., the film layer 730) printed by using an ink or a paint of an opaque color, and an IR ink layer (e.g., the IR ink layer 770) formed by using an IR ink.

According to various embodiments, the film layer may include a molding pattern.

According to various embodiments, the IR ink layer may be aligned with the opening.

According to various embodiments, the IR ink layer may increase a first ratio by which light of a first wavelength band passes through the color layer to a designated value or more, or decrease a second ratio by which light of a second wavelength band passes through the color layer to a designated value or less.

According to various embodiments, a cover window (e.g., the cover window 110) of an electronic device may include a glass layer formed of a transparent material, disposed at an outskirt of the electronic device, and configured to protect the electronic device from an external impact, a color layer stacked under the glass layer and configured to realize a designated color, and an opaque layer stacked under the color layer and printed opaquely in an area other than a designated area of the cover window. Light of a first wavelength band may pass through the color layer at a first ratio or more, and light of a second wavelength band may pass through the color layer at a second ratio or less.

According to various embodiments, the first wavelength band may correspond to an infrared ray area including a wavelength of 940 nm, the second wavelength band may correspond to a visual ray area including a wavelength of 550 nm, the first ratio may be 20%, and the second ratio may be 15%.

According to various embodiments, the color layer may include at least one oxide or nitride deposition layer and at least one metal thin film deposition layer, or include a printed painting film.

According to various embodiments, the cover window may further include at least one of a film layer printed by using an ink or a paint of an opaque color, and an IR ink layer formed by using an IR ink.

According to embodiments of the present disclosure, an integral feeling of an external appearance of an electronic device may be increased by preventing the sensor hole formed in the cover window from being viewed from the outside.

In addition, the present disclosure may provide various effects that are directly or indirectly recognized.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 257), the processor may perform functions corresponding to the instructions. The computer-readable storage medium may be, for example, the memory 258.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing; and
   a display module including a window cover forming a first surface of the housing;
   wherein the window cover comprises:
      a glass layer that is substantially transparent;
      an opaque layer disposed under the glass layer;
      an infrared (IR) ink layer formed by using an IR ink; and
      a color layer disposed between the opaque layer and the glass layer and forming at least a portion of a color exposed through the glass layer,
   wherein the color layer comprises:
      a first layer disposed between the glass layer and the opaque layer and having a first refractive index, and
      a second layer disposed between the first layer and the opaque layer and having a second refractive index that is smaller than the first refractive index.

2. The electronic device of claim 1, wherein the color layer has a thickness of 10 nm to 130 nm.

3. The electronic device of claim 1, wherein the color layer has a thickness of 10 nm to 500 nm.

4. The electronic device of claim 1, wherein the color layer has a thickness of 5 μm to 50 μm.

5. The electronic device of claim 1, further comprising: an optical sensor included within the housing, disposed under the window cover of the housing, and the optical sensor is configured to receive and/or emit infrared light, and wherein the opaque layer comprises an opening, wherein the optical sensor receives and/or emits infrared light through the opening, the color layer, the IR ink layer, and the glass layer, and wherein the color layer further comprises a third layer disposed between the first layer and the second layer.

6. The electronic device of claim 5, wherein a ratio of a thickness of the first layer and a thickness of the second layer is in a range between 0.48:1.09 to 7.33:16.50.

7. The electronic device of claim 5, wherein the first layer and the second layer comprise at least one of SiO2, TiO2, Al2O3, Nb2O5, MgF2, Ti2O5, SnO2, ZnO, Ta2O5, MgO, Si3N4, ITO, AlN, AlON, TiN, Ti3O5, and ZrO2, and the third layer comprises at least one of In, Al, Ag, Sn, and Ag.

8. The electronic device of claim 5, wherein the third layer has a thickness of not greater than 50 nm.

9. The electronic device of claim 1, wherein light of a first wavelength band passes through the color layer at at least a first ratio, and light of a second wavelength band passes through the color layer at not greater than a second ratio.

10. The electronic device of claim 9, wherein the first wavelength band corresponds to an infrared light area including a wavelength of 940 nm, and the second wavelength band corresponds to a visible light area including a wavelength of 550 nm.

11. The electronic device of claim 9, wherein the first ratio is 20% and the second ratio is 15%.

12. The electronic device of claim 1, wherein the color layer is formed by using at least one of color ink, a curing agent, a diluent or a solvent.

13. The electronic device of claim 1, further comprising:
   a film layer printed by using an ink or a paint of an opaque color.

14. The electronic device of claim 13, wherein the film layer comprises a molding pattern.

15. The electronic device of claim 13, wherein the IR ink layer is aligned with an opening.

16. The electronic device of claim 13, wherein the IR ink layer increases a first ratio by which light of a first wavelength band passes through the color layer to at least a designated value, or decreases a second ratio by which light of a second wavelength band passes through the color layer to not greater than a second designated value.

17. A cover window of an electronic device, the cover window comprising:
   a glass layer formed of a transparent material, the glass layer is configured to be disposed at an outskirt of the electronic device, and is configured to protect the electronic device from an external impact;
   a color layer stacked under the glass layer and configured to realize a designated color;
   an opaque layer stacked under the color layer and printed opaquely in an area other than a designated area of the cover window; and
   an infrared (IR) ink layer formed by using an IR ink,
   wherein light of a first wavelength band passes through the color layer at at least a first ratio, and light of a second wavelength band passes through the color layer at not greater than a second ratio, and
   wherein the color layer comprises:
      a first layer disposed between the glass layer and the opaque layer and having a first refractive index; and
      a second layer disposed between the first layer and the opaque layer and having a second refractive index that is smaller than the first refractive index.

18. The cover window of claim 17, wherein the first wavelength band corresponds to an infrared light area including a wavelength of 940 nm, the second wavelength band corresponds to a visible light area including a wavelength of 550 nm, the first ratio is 20%, and the second ratio is 15%.

19. The cover window of claim 17, wherein the color layer comprises at least one oxide or nitride deposition layer and at least one metal thin film deposition layer, or the color layer comprises a printed painting film.

20. The cover window of claim 17, further comprising:
a film layer printed by using an ink or a paint of an opaque color.

* * * * *